United States Patent [19]

König et al.

[11] Patent Number: 4,688,937

[45] Date of Patent: Aug. 25, 1987

[54] METHODS OF, AND SYSTEMS, FOR MONITORING AND/OR CONTROLLING MOBILE CUTTING MEANS

[75] Inventors: Johannes König; Wilhelm Kurfürst, both of Munich; Hans-Günther Willers, Karlsfeld; Martin Reuter, Munich, all of Fed. Rep. of Germany

[73] Assignee: Gewerkschaft Eisenhutte Westfalia, Kunen, Fed. Rep. of Germany

[21] Appl. No.: 699,533

[22] Filed: Feb. 8, 1985

[30] Foreign Application Priority Data

Feb. 9, 1984 [DE] Fed. Rep. of Germany ....... 3404496

[51] Int. Cl.[4] ............................................. G01B 11/00
[52] U.S. Cl. ....................................... 356/153; 356/5; 356/375; 356/400; 299/1
[58] Field of Search ...................... 356/4, 5, 152, 153, 356/373, 375, 400; 299/1

[56] References Cited

U.S. PATENT DOCUMENTS

| 3,552,857 | 1/1971 | Hock et al. | |
|---|---|---|---|
| 4,402,603 | 9/1983 | Lill | |
| 4,466,667 | 8/1984 | Paulsen et al. | 299/1 |
| 4,560,272 | 12/1985 | Harris | 356/153 |

FOREIGN PATENT DOCUMENTS

| 7886 | 2/1980 | European Pat. Off. | |
|---|---|---|---|
| 0016297 | 10/1980 | European Pat. Off. | 299/1 |
| 2416947 | 10/1975 | Fed. Rep. of Germany | 299/1 |
| 2427816 | 1/1976 | Fed. Rep. of Germany | 299/1 |
| WO82/00196 | 1/1982 | PCT Int'l Appl. | |
| 991892 | 5/1965 | United Kingdom | |
| 1152709 | 5/1969 | United Kingdom | |
| 1342875 | 1/1974 | United Kingdom | |
| 1381157 | 1/1975 | United Kingdom | |
| 1477974 | 6/1977 | United Kingdom | |
| 1496760 | 1/1978 | United Kingdom | |
| 1583675 | 1/1981 | United Kingdom | |
| 2019155 | 6/1982 | United Kingdom | |
| 2090096 | 6/1982 | United Kingdom | |
| 2101742 | 1/1983 | United Kingdom | |
| 2119833 | 11/1983 | United Kingdom | |

Primary Examiner—F. L. Evans
Attorney, Agent, or Firm—Sughrue, Mion, Zinn, Macpeak and Seas

[57] ABSTRACT

A system serves to establish the spatial positions of a cutter head of a tunnel driving machine with precision and monitors and/or controls this position automatically. The system uses a computer-controlled laser beam scanning technique to locate the three-dimensional positions of mirror devices in successive measuring stations spaced along the tunnel.

23 Claims, 8 Drawing Figures

METHODS OF, AND SYSTEMS, FOR MONITORING AND/OR CONTROLLING MOBILE CUTTING MEANS

FIELD OF THE INVENTION

The invention relates to a method of, and a system for monitoring and/or controlling a mobile cutting means, such as a tunnel driving machine or its cutter head.

BACKGROUND TO THE INVENTION

Known machines for the driving of underground cavities, such as tunnels, adits, underground roadways and the like of the partial-cut type have a vertically and laterally pivotable cutter arm carrying a driven cutter head on its free end. In order to cut a predetermined tunnel cross-sectional profile with sufficient accuracy and ensure the tunnel progresses with high directional accuracy, in the past numerous methods and control apparatuses have been developed. It is known to use a light beam created by a laser which serves as a reference. See for example German patent specifications Nos. 1,955,866; 2,201,403; 2,531,759; 2,458,514 and 2,416,947. The known methods and apparatuses work as a rule with the aid of a three-dimensionally fixed laser beam serving as a guide. In the known methods after each re-positioning of the cutting machine and before renewed commencement of the driving work a survey must be carried out in which a target arranged on the machine, say on an arm carrying a cutter head, is brought into coincidence with the laser beam in order to ascertain the actual position of the machine or its deviation from the ideal position. Since the cutter head can move freely in all three dimensional directions, the known methods at best merely define a profile within which the cutter head can move freely, or else they establish the position of the cutting machine in only one direction. The cutting machine can in this latter case carry out small movements by extrapolation and the freedom of movement and working accuracy of the machine are limited. For permitting greater movement of the cutting machine it is necessary to readjust the guide laser and the cutting machine, and furthermore a three-dimensional positional determination of the cutter head is not possible since the laser is fixed and is usually in contact with the machine for only a short time. Furthermore the known methods are mostly specifically adapted to the machine, since geometrical variables of the different types of cutting machines affect the calculation of the positional co-ordinates. If the cutting machine changes its position during the cutting work, which is not impossible even if the machine is stayed, accurately profiled cutting is no longer possible.

It is a general object of the invention to provide an improved method and system with which independently of the type of machine a precise determination of the spatial position of the cutter head can be carried out at any time during the operation of the machine.

SUMMARY OF THE INVENTION

In its broadest aspect the invention provides a method of monitoring and/or controlling the position of a mobile cutting means by traverse survey measurements utilizing one or computer-controlled laser beams representing measurement vectors.

The invention also provides a method of monitoring and/or controlling the operating position of mobile cutting means; said method comprising providing a light beam from a reference station, displacing said beam in a controlled manner, detecting reflection of the beam from another station associated with the mobile cutting means and determining the spatial position of the other station utilizing data provided by the reference station. The other station may be on a machine having a swingable cutter head or on an arm supporting this head. The position of the cutting means can be just monitored in which case manual control of the machine is adopted or else the machine or its cutter head may be controlled automatically. In another aspect, the invention provides a system or apparatus for carrying out the method. The system may comprise a reference station, the position of which is pre-determined, remote from the cutting means, at least one other station associated with the cutting means, the other station employing light reflective means and the reference station employing means for providing a light beam, means for displacing the light beam in a controlled manner, means for detecting light reflected by the other station indicative of its position and means for providing data signifiying the spatial position of the other station.

The system is distinguished by high accuracy of measurement and operational reliability even under the harsh working conditions encountered in tunnelling and mining.

A method according to the invention serves to determine the position of a cutter head, for example, by starting from a spatially fixed known reference point, far remote from the driving machine or its cutter arm, and using traverse survey measurements under computer control with the aid of at least one laser measurement vector representing a polygon side or several such vectors necessitating several measuring stations. The measurements are expediently carried out continuously and automatically during the operation of the driving machine to continuously determine the position of the cutter head movable vertically and laterally so that the three-dimensional position of the cutter head is known at all times. The method is independent of the type of cutting machine and the system preferably employs self-contained structural units easily fitted to provide the measurement stations. The spatial co-ordinates of the cutter head or equivalent are preferably continuously determined by a computer in relation to the known co-ordinate of the reference station by the emission and detection of reflected laser beams forming the vectors. The system may cause the laser beams to scan over controlled angular directions to locate reflectors in the stations subsequent to the reference. Angle measuring instruments and distance or range finding means in the stations may provide information accepted as input data for the computer to describe the spatial co-ordinate of the stations. The relative position of the co-ordinates of two points in the traverse survey can be unambiguously determined in a manner known per se by co-ordinate transformation in dependence upon six linearly independent variables. It is to transmit the ascertained measured data by modulation of the laser beam or beams.

The distance between stations linked by a double-path laser beam can be determined by measurement of the transit time of the laser beam and its reflection. A central control unit with the main computer can be arranged on the frame of the driving machine and receives all the information as to the relative co-ordinates and length of the traverse vectors and from this information calculates the actual position of the cutter head in each case. The computer can be used at the same time for the control of the driving machine, for example, in the sense of maintaining a cross-sectional profile. Sub-computers in the stations can be linked to the main computer. The subcomputers can control the scanning or laser beam displacement processes to ascertain the measurement data and can communicate with one another and with the central computer. The sub-computers may each calculate the positional co-ordinates of its stations from the data transmitted by the incident laser, can imposed by modulation further positional data on to the laser beam issuing from the station and/or communicate with the central computer.

As appears hereinafter a computer-controlled displaceable laser arranged at the relevant measurement station can find the bearing of a passive triple-mirror device at another station which reflects the laser beam. As is known a triple-mirror possesses the property of always reflecting a light beam parallel to itself. The parallel offset of the reflected light beam is thus proportional to the distance of the incident laser beam from the centre of the triple-mirror and a zero parallel offset signifies the centre of the triple-mirror has been located. In this way the beam can be angularly orientated to exactly locate to the triple-mirror device. As a rule triple-mirrors possess a triagonal base surface. It is however advisable in the system according to the invention to use a triple mirror device with a hexagonal or round base in order to permit a favourable laser beam diameter of about 10 to 15 mm. to be used.

As mentioned, data transmission can take place by modulation of the laser beam. To detect this data, a sensing means is located behind the centre of the triple mirror device which has a central axial window transmitting the laser beam to the sensing means. Preferably a undimensional optical processor is disposed to receive light passing through said window and further sensing means is provided to indicate the angular direction of the light beam relative to the mirror device.

The invention may be understood more readily, and various other features and aspects of the invention may become apparent, from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
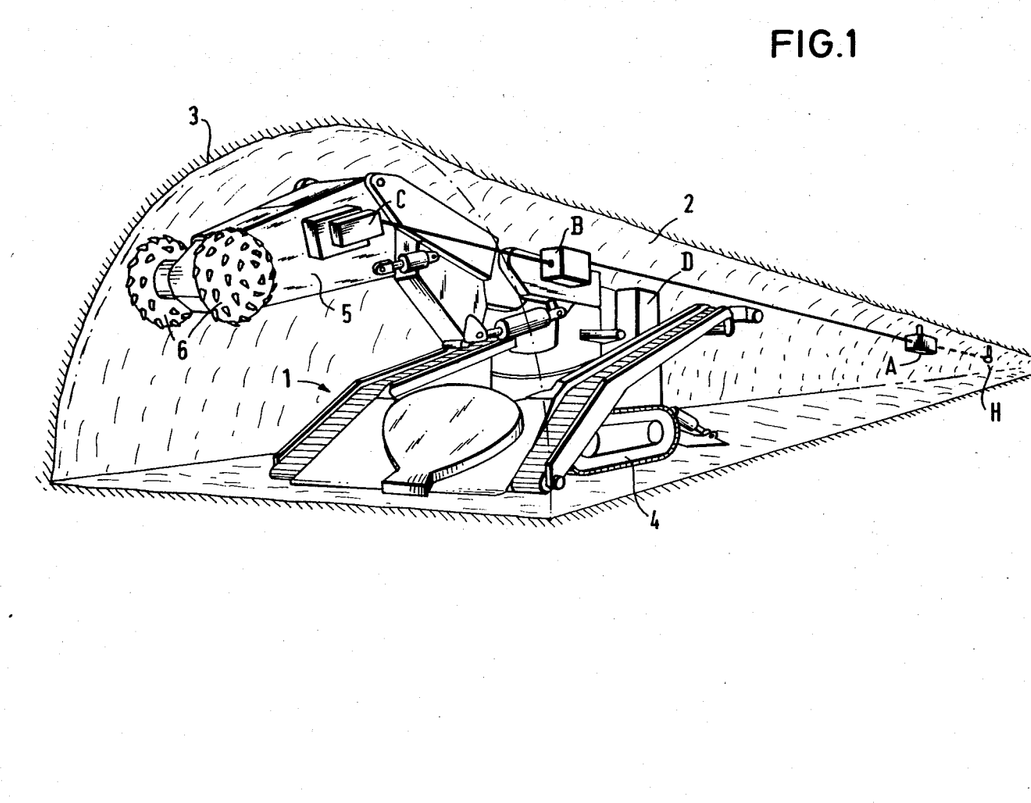
FIG. 1 is a perspective view of a machine used for driving an underground tunnel in conjunction with a monitoring/control system constructed in accordance with the invention.

FIG. 1 shows a partial-cut machine 1 of known design in its working position excavating an underground tunnel or roadway 2. The machine is creating a tunnel 2 of domed or horse-shoe shaped cross-sectional profile 3 but this is merely representative. The machine 1 itself has a frame supported by endless tracks 4 permitting the machine 1 to be moved. The machine 1 employs an arm 5 carrying a cutting head or cutting means 6 at its free end. The arm 5 is mounted for vertical and horizontal swinging motion so that the cutting head 6 can range over the entire working face in front of the machine. A loading appliance in conjunction with conveyors serves to transfer the spoil away from the region below the cutting head 6.

In order to ensure that the tunnel progresses in the correct direction and to ensure that the desired profile 3 is maintained, the position of the cutting head 6 is monitored and controlled with the aid of a method and a system constructed in accordance with the invention. As shown in FIG. 1, the system has operating or measuring stations A, B and C and a control station D. Station A forms a known positional reference for the measurements and is located at some considerable distance behind the machine 1. Typically the station A lies at about 60 to 120 meters from the machine 1. The station B forms an intermediate reference in direct line of sight to the station A. The station B lies at or near the vicinity of the machine 1 and conveniently station B can be fixed to the frame of the machine 1. The station C is located on the cutter arm 5 itself so that its spatial position represents the location of the cutting head 6 which is at a known distance therefrom. The station C is in direct line of sight to the station B. It is possible to utilise several auxiliary intermediate stations, instead of a single intermediate station B, between the reference station A and the station C which can move in three spatial dimensions in relation to the fixed station A. In some cases it may be possible to omit the intermediate station B entirely and then the stations A and C would be in direct communication. The line of sight communication link between these stations A, B, C permits light beams provided by lasers to be used in the survey measurements.

The spatial co-ordinates of the station A may be determined and checked periodically by reverse measurement to one or more fixed reference points H. If an instrument with a magnetic compass is utilised at the station A then only one reference point H is needed; otherwise two reference points H are required to define the position of the reference station A. During operation, a control station D with a central computer responds to information provided by computers in the stations A, B, C and supervises the system continuously to monitor and/or control the position of the cutting head 6 in three-dimensions.

Figure 3:
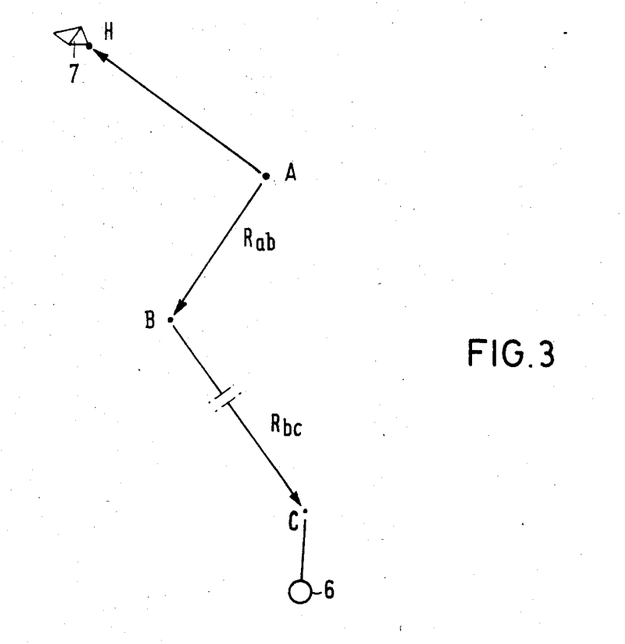
FIG. 3 depicts the measuring co-ordinates pertaining to the system.
Figure 4:
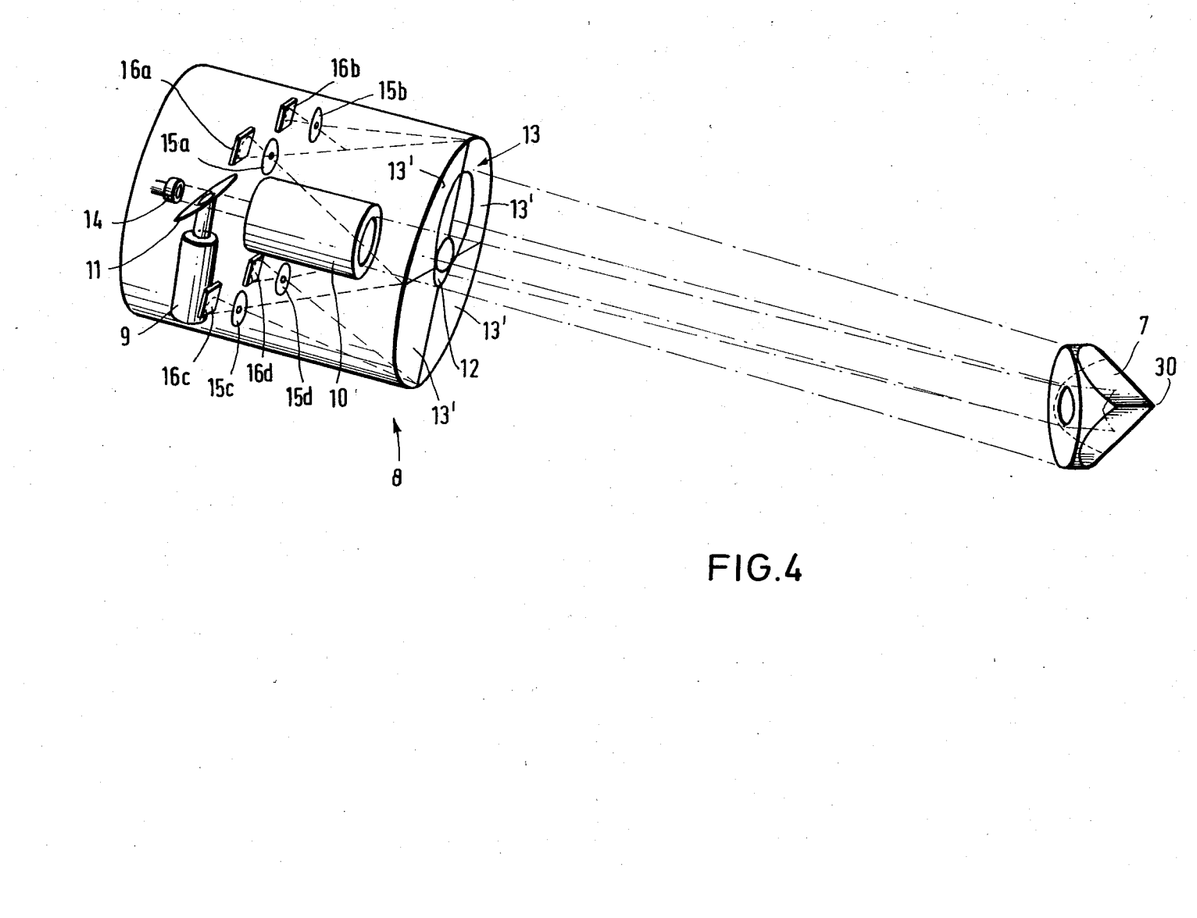
FIG. 4 is a perspective representation of devices used in the system.

FIG. 3 depicts the measuring vectors pertaining to the method of the invention. The vector Rab joining the stations A, B and the vector Rbc joining the stations B, C also permit unidirectional transmission of data in the directions indicated by arrows by the laser-created light beams. Thus information concerning the measured co-ordinates and directions can be superimposed on the light beams. As described hereinafter, the measuring vectors Rab, Rbc are defined by a light beam emitted by one station and a reflection of the beam from light reflective means at the other station. The spatial positions of the reflective means in three dimensions can then be accurately located and assessed and this in conjunction with the lengths of the vectors Rab, Rbc representing distances enable calculations to be made in the control station D to automatically position the cutting head 6 or at least to indicate its position. The measurement method is accomplished by laser beam traverse survey with the end points of the vectors Rab, Rbc determined expediently in polar co-ordinates and the vectors Rab, Rbc representing polygonal sides. The angles of inclination, that is transverse inclination and longitudinal inclination and the angle of rotation, between the axes of the vectors Rab, Rbc are assessed and the co-ordinates of the cutting head 6 in relation to the station A is ascertained by the computer in the control station D from the vector component co-ordinates. The actual lengths of the vectors Rab and Rbc are ascertained by assessment of the distance travelled by the laser beam in question and more particularly by measuring the transit time of a beam and its reflection. The measurement of the angles between a laser beam entering station B and a laser beam leaving the station B is assessed with the aid of angle coders whereas the angles in relation to the horizontal and vertical are assessed by means of inclinometers. In the preferred embodiment each measurement section representing the vectors Rab and Rbc has a laser at one end and reflective means in the form of a triple-mirror device at the other end. FIG. 4 represents the relevant devices for use over one measuring section of the system. As shown in FIG. 4, a unit or laser head 8 serves to ascertain the three dimensional position of a triple-mirror device 7 and to this end the unit 8 emits a laser beam which is transmitted from the unit 8 to the mirror device 7 and is reflected back to the unit 8. When the laser beam is orientated centrally of the device 7, the reflected beam has at least a major component parallel to the original beam. The reflected light is detected in the unit 8 and is used not only to signify the alignment of the laser beam vis a vis the device 7 but also to ascertain the distance from the unit 8 to the center of the mirror device 7. The mirror device 7 can be of such design and dimensions to be suitable for a circulated light beam of about 10 to 15 mm in diameter. A light transmitting central region of the device 7 forms a window 30. When the light beam from the unit 8 is made to scan or sweep over the mirror device 7 the reflected beam returns at an angle until the position of the reflected beam is parallel to the original beam signifying that the centre of the device 7 has been located. Thus by ascertaining the movement of the unit 8 to achieve the parallelism of the reflected beam from the mirror device 7 a precise measurement of the location co-ordinates of the mirror device 7 can be made. Once the position of the mirror device 7 has been ascertained by the scanning operation, the transit time of the beam from the unit 8 and back to the unit 8 is ascertained in order to determine the distance of the device 7 from the unit 8. The angular displacement of the unit 8 to locate the centre of the device 7 and the distance then defines the position of the device 7 in relation to the unit 8 and hence the vector Rab or Rbc. A mirror device 7 is located at each of the stations B and C and operates in conjunction with a unit 8 which is located in each of the stations A and B. The unit 8 is a self-contained unit positionally adjustable in relation to the associated mirror device 7. As shown, the unit 8 has a laser 9 orientated transversally to the main light path. A beam splitter 11, such as semi-transparent plane mirror, redirects the light emitted by the laser 9 into an optical system 10 which provides some divergence creating a wider beam emanating from a window 12 defined by a lens system 13 at one end of the unit 8. The system 10 may be composed of several lenses or several lenses with an intermediate filter or window. The collimated beam passes to the mirror device 7 and is then deflected over various paths by virtue of reflecting surfaces of the device 7 back to the unit 8. The part of the reflected beam which returns centrally of the lens system 13, that is within the window 12 emanates from the centre of the device 7, is converged by the optical system 10 and returns via the beam splitter 11 to be focussed with an additional lens (not shown) on to a photo detector 14 with a fast response. Means is provided to assess the time interval between the initial beam and the reflected beam detected by the sensor 14 in order to ascertain the distance of the device 7 from the unit 8, that is to assess the length of the vector Rab or Rbc. Any part of the reflected beam which impinges on the lens system 13 outside of the window 12 is assessed separately. The lens system 13 around the window 12 is symmetrical and composed of two or more, preferably four, Fresnel lenses 13', the optical axes of which extend parallel to the central optical axis defined by the optical system 10. Two or more, preferably four, three- dimensional filters 15a to 15d, such as slits or orifices, are located in the focal planes of the lenses 13' to pass light parallel to the main axis of the system 10. This arrangement makes it possible to provide a unit 8 of moderate overall length since the optical paths between the lenses 13' and the filters 15a to 15d are outside of the optical system 10. Each of the filters 15a to 15d is associated with a sensor 16a to 16d which provides signals collectively indicative of the proportion of reflected light passing through the associated quadrants defined by the lenses 13'. When the unit 8 is brought into alignment with centre of the mirror device 7 the sensors 16a to 16d will provide signals of the same intensity and by moving the unit 8 in accordance with the actual signals produced by the sensors 16a to 16d and/or under a control sequence determined by a computer to bring about this equality, the position of the mirror device 7 can be ascertained with precision. The laser beam provided by, the unit 8 can be also be modulated in known manner to transmit information, for example, as to the dynamic position of the unit 8. Once the correct alignment has been established the angular movement of the unit 8 signifies the measured co-ordinates of the device 7 which is under investigation. The transmitted data can be received by a sensor 18 (FIGS. 6 and 7) positioned at the rear of the centre window 30 of the device 7.

The unit 8 itself is particularly compact and the various lenses have a relatively short focal length. Adjustment of the laser 9 can be effected by displacement of the beam splitter 11. A robust semi-conductor laser is especially suitable for use in the unit since its output is readily modulated for data transmission and distance measurements.

The sensor 18 provided behind the mirror device 7 (FIGS. 6 and 7) receives the portion of the incoming light beam which pass through the central window 30 of the mirror device 7 as shown in FIG. 4. The sensor 18 can thus also indicate whether the mirror device 7 has received and reflected the original beam. This in turn indicates that a proper transmission path exists between the unit 8 and the mirror device 7, regardless of alignment. Should an obstacle obstruct the light beam, the sensor 18 will not produce a signal and so long as the sensor 18 produces a signal this signifies the sensor 18 is enabled to respond to information transmitted by the beam. Should the laser beam be interrupted the associated sensor 18 may induce the laser 9 to cease operation or to reduce its intensity for safety.

Figure 5:
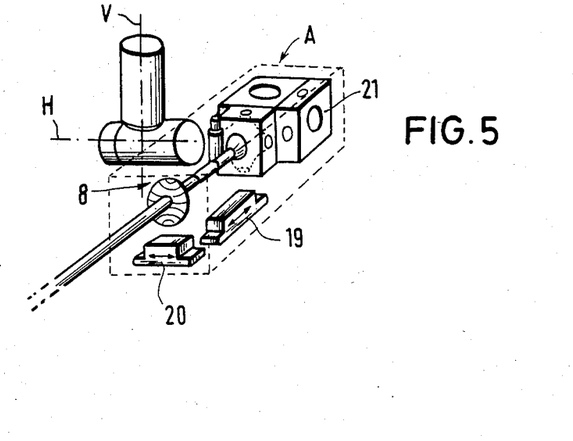
FIGS. 5 to 7 are perspective representations of the individual measuring stations of the system.
Figures 6, 7:
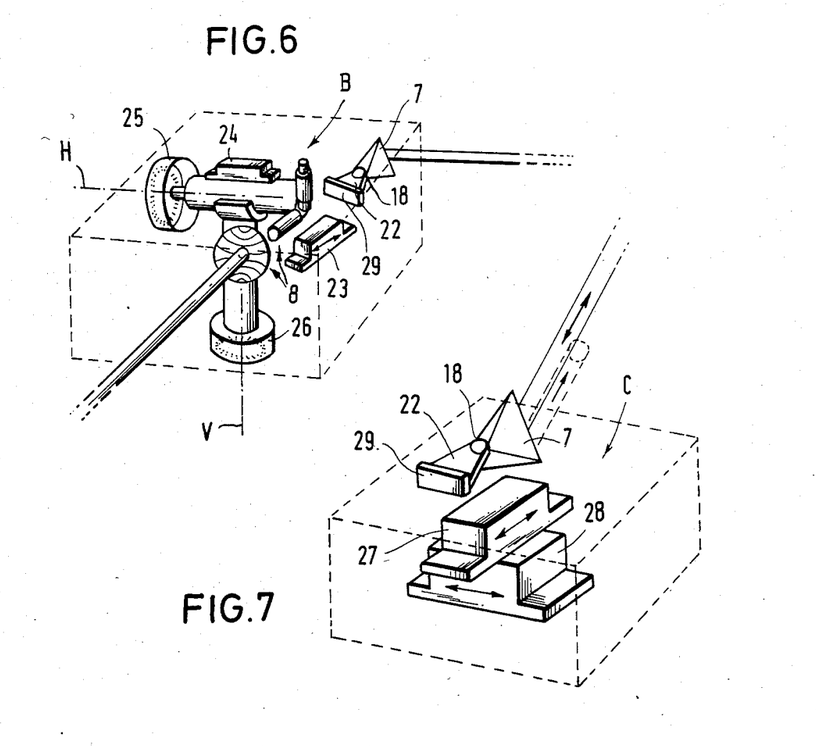

FIGS. 5 to 7 depict preferred arrangements for each of the stations A, B and C, respectively. Thus the station A shown in FIG. 5 employs the unit 8 described above in connection with FIG. 4 and is suspended for motion about two axes that is a horizontal axis H and a vertical axis V. The seeking-out of the mirror device 7 at the associated station B is effected by moving the station A about these axis V, H by means of a suitable drive system. The co-ordinates of the mirror device 7 at the station B can then be transmitted through the laser beam passing between the stations A and B as described. The station A also employs a precision longitudinal inclination indicator 19, a transverse inclination indicator 20 and a magnetic/north-seeking navigational instrument such as a gyro-compass 21. Instead of the instrument 21 it is also possible to use precision angle coders. All the components are combined with the unit 8 as one constructional assembly constituting the station A movable about the axes H and V. The indicators 19, 20 determine the inclination of the station A while the instrument 21 determines the angle between the north-south magnetic earth axis and the station A. The initial reference co-ordinates of the station A itself can be ascertained by again using a mirror device 7 in a known position (H in FIG. 1) by locating the station A in the manner described in relation to this mirror device 7 at H and ascertaining the readings provided by the indicators 18, 20 and the instrument 21. If the instrument 21 is replaced by the angle coders, the position of the station A can be ascertained by taking a bearing on the mirror device 7 in the position H and setting up the corresponding zero reference data for the axes H and V. The other angle data is provided by the indicators 19, 20. Once the station A has been set up, the position of the mirror device 7 at the station B is determined together with the distance between the stations A and B by scanning with the laser beam to locate the centre of the device 7.

The station B is shown in FIG. 6 to be composed of the unit 8, the mirror device 7 having the detector 18 together with another optical device 22 and a further sensor 29, described hereinafter, a longitudinal inclination indicator 23, a transverse inclination indicator 24 and angle coders 25, 26. The horizontal axis angle coder 25 and the vertical axis angle coder 26 determine the movement of the station B about these axes and increase the accuracy where relatively large longitudinal/transverse inclinations occur. These various components are again united in one constructional assembly mounted for controlled movement about the two axes H and V. This can be achieved by means of a Cardan-type suspension or where relatively small angles are involved by means of a ball type mounting. The movements of the station B about the axes H and V is achieved by a drive system under control of a computer. The co-ordinates of the station B defining its position would be ascertained by reference to the laser beam passed to the station B from the station A back again by way of its mirror device 7. The direction of the laser beam emitted by the unit 8 of the station B in seeking out the mirror device 7 of the station C is determined by means of the indicators 23, 24 and coders 25, 26. The station B would be positionally defined by the station A seeking our its mirror device 7 and information describing its position would be transmitted to the station B. The station B then seeks out the mirror device 7 in the station C and passes information to this station C describing its position by way of its emitted laser beam. As mentioned previously several intermediate stations B could be provided. The station C shown in FIG. 7 is composed of a triple-mirror device 7, with the associated optical device 22 and sensors 18, 29, a longitudinal inclination indicator 27 and a transverse inclination indicator 28. Again, all these components are combined in one constructional assembly constituting the station C. The station C is rigidly fixed to the arm 5 of the machine 1 and the distance between the cutting head 6 and the station C is predetermined so that when the co-ordinates of the station C have been ascertained the position of the cutting head 6 is also defined.

Figure 8:
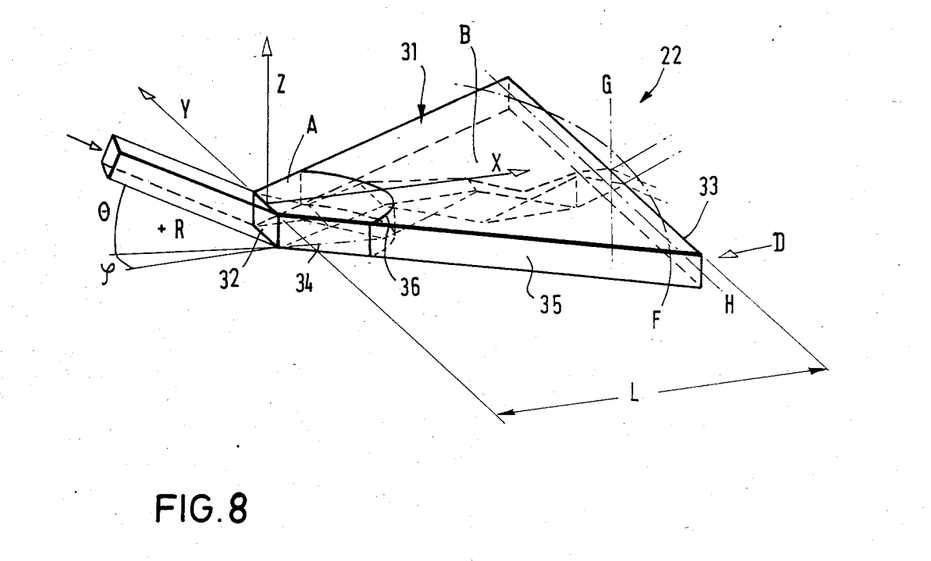
FIG. 8 is a perspective representation of another device used in the system.

FIG. 8 depicts the optical device 22 associated with the mirror device 7 in the stations B and C. The device 22 and its sensor 29 functions as a unidimensional optical processor. The device 22 is composed of a thin prismatic block 31 which serves to collect light reaching the rear corner of the device 7 by way of its central window 30 (FIG. 4). In both the stations B, C the horizontal angle $p$ between the incoming laser beam and the device 7 is determined by the sensor 29 while the vertical angle $\theta$ is of no interest. The optical device 22 serves to eliminate the effect of angle $\theta$ while enabling the angle $p$ to be measured by the sensor 29 which is a linear charge-coupled photo-electric array. The block 31 constructed from optically transparent glass has planar upper and lower parallel faces. The narrow planar end face 32 of the block 31 receives the incoming light as shown at various angles. The larger planar end face 33 forms a two-dimensional light conductor and receives light trapped in the block 31 due to multiple total internal reflections. The light beam which emerges from the end face 33 is shifted by a distance $\delta x$ in relation to a perpendicular to the face 32 at the point of entry with an exit angle $p$ which corresponds to the entry angle $p$ of the light beam. The exit angle $\theta$ is also equal to the entry angle $\theta$ but can possess the opposite sign. The distance $\delta x$ depends upon the angle $p$ the overall length L of the component 31 and the refractive index n of the block 31 and is independent of the angle $\theta$. If the light beam striking the face 32 has a cross-section of the same order of magnitude as the thickness of a block 31 by then choosing the various limiting angles the distribution of light intensity across the face 33 can be made to depend only upon the horizontal angle $p$. The intensity of the light emerging from the face 33 of the block 31 is independent of the angle $\theta$ in the region to the rear of the block 31 defined by the face 33 and delimited laterally by plus or minus $\theta$ max. The light intensity distribution can thus be determined by a narrow linear array serving as the sensor 29 disposed at an appropriate short distance to the rear of the face 33. The linear photoelectric array 29 preferably covers an angular range of about plus or minus 40° and provides a signal which can be evaluated in terms of angles $p$ from an intensity distribution curve to signify the value of the angle at the point of entry on the surface 32.

The block 31 performs the above-mentioned function by, inter alia, incorporating a cylindrical lens acting on the passage of the light through the block 31. This cylindrical lens designated 36 is created by constructing the block 31 from two components 34, 35 of different refractive indices and appropriate shaping. In the preferred embodiment the convex end region of the component 34 is fused to a concave end region of the component 35 with optical cement or the like. The centre R of the cylindrical lens 36 formed by the mating end regions of the components 34, 35 is disposed outwardly beyond the end face 32. The refractive index of the two components 34, 35 are made different, for example, by making the components 34, 35 from a crown class type BK1 and a heavy flint glass SF6 (the limiting angle with such an arrangement is about 45°). The mating curved surfaces of the components 34, 35 of the block 31 defining the cylindrical lens 36 enables light beams with different coordinates y arriving on the end face 32 to be focussed on a line H. Beams with different vertical co-ordinates and angles are then transposed by total internal reflection and emerge from the rear face 33 as linear displays. A parallel bunch of rays will strike along a line G; the locus of G in the y direction depending only on the angle to be measured. If the surface 36 is a true cylindrical surface the focal line describes a circle F. Because of the limiting surfaces of the components 34, 35 with different refractive indices a variation in the angle $\theta$ does influence the result of the measurement of the angle $\rho$ but this dependence can be eliminated by appropriate calculation in the computer knowing the angle of the device 22 in relation to the associated measuring station, that is the co-ordinates of the latter, for example, taken by means of the inclinometer measurements. Variations in the refractive index in the path of the light beam must also be avoided if these measurements are to be valid, such as by passing the laser beam through air of the same density.

The block 31 forming the device 22 could be replaced by a system of mirrors with a small air gap in between, say about, 2 mm, and by a slotted plate mounted at the entry of the beam to extend parallel to a surface normal to the mirrors. In this case the horizontal component of the incoming beam will be defined by the slot and the beam extending between the mirrors can be deflected onto a linear array as before.

The devices which form a unidimensional optical processor eliminate the dependence of the measurement in one direction by means of a slot or a cylindrical lens which fixes the locus of the beam in one direction and permits it to vary in a direction perpendicular thereto. These processors used in the stations B and C permit data to be derived which aids the survey technique in locating the mirror device 7 by indicating the incoming beam direction and this data can be fed back to the computer of the stations A and B and/or to the computer of the central unit D.

It is not essential to transmit information by way of the laser beams since this can be achieved in other ways, e.g. by cables or radio or other links or connections.

Figure 2:
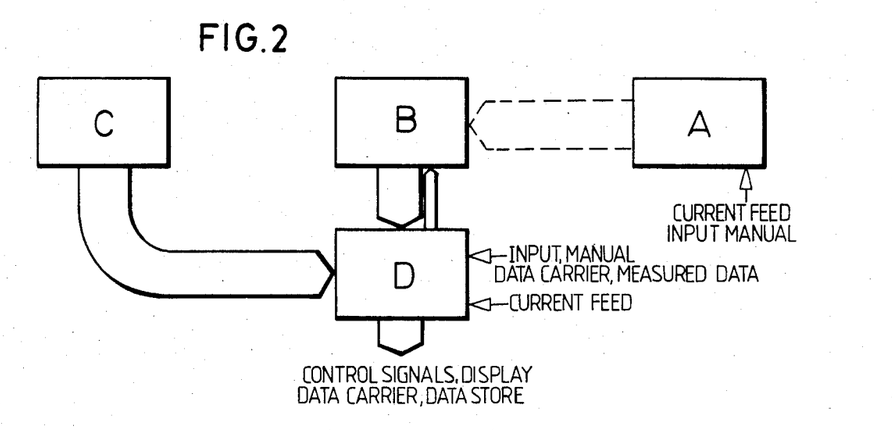
FIG. 2 is a block schematic diagram depicting the system constructed in accordance with the invention.

At least one of the stations B, C and usually the station C would be connected via cables to the control unit D. FIG. 2 depicts one arrangement where the unit D receives information from, inter alia, the stations B and C. The control unit D has the main or central computer which is supplied with information from individual computers in the stations A, B and C during the bearing or surveying operations and including the relative coordinates of the vectors shown in FIG. 3 to thereby determine by calculation the absolute co-ordinates of the station C. The cutting head 6 is then moved by way of the arm 5 under control of the unit D. The computers at the stations A, B, C can be micro-computers. The computer of the station A would orientate the station A in a controlled manner to locate the mirror device 7 of the station B and deviation of the station B by movement of the machine 1 can be corrected by way of the control unit D and the computer of the station B. The computer of the station A would receive the readings of the indicators 19, 20 and the instrument 21. A set of reference conditions can be fed into the computer to serve as the basis for further calculations. The computer of the station A then provides output information representing the measured parameters to the computer of the station B, e.g. by way of the laser beam passed therebetween. The computer of the station B receives the information from the laser beam provided by the station A and determines the location of the beam with the optical processor 22 and the sensor 29. The computer of the station B controls the motion of the station B in seeking out the mirror device 7 of the station C and also receives the readings of the indicators 23, 24 and coders 25, 26. The computer of the station B then provides to the unit D and possibly the station C, the information received from the station A and data collected at the station B. The computer in the station C receives information relating to the location of the incoming beam by way of its optical processor 22 and the sensor 29 and the reading of the indicators 27, 28. The central or main computer in the unit D evaluates the dynamic position of the cutter head 6 with reference to the station A by utilising the data supplied by the station sub-computers. Conveniently the computer of the station A has an associated keyboard and display enabling information to be displayed to a user, such as whether the mirror device 7 of the station B has been located and whether the station A is operating normally. The input of commands via the keyboard can initiate the measurement operations and the laser beam can desirably be switched on and off in this manner. The computer of the station B serves primarily to collect information from the station A and locally while the computer of station C seves primarily to communicate with the main computer in the control unit D.

We claim:

1. A method of monitoring and/or controlling the operating position of mobile cutting means remote from a reference station, comprising the steps of:
    (a) ascertaining the position of said reference station with respect to one or more known measurement points;
    (b) providing a first measurement station having light reflective means on the mobile cutting means so as to move therewith;
    (c) providing a laser light beam from the reference station,
    (d) displacing said beam under computer control while detecting the reflection of the beam from the reflective means of the first measurement station until coincidence occurs,
    (e) ascertaining from angular displacement relationships necessary to achieve coincidence the spatial co-ordinates of the first measurement station relative to the reference station,
    (f) ascertaining from a measurement of the transit time of the first beam and its reflection the distance between the first measurement station and the reference station;
    (g) assessing the resultant measurement data continuously and automatically, and
    (h) monitoring and/or controlling the operating position of the mobile cutting means in accordance with the assessment.

2. A method according to claim 1 and further comprising detecting an angle of incidence of the laser beam at the reflective means to produce information, using this information to control the displacement of the beam, and transferring measurement data between the stations by modulation and demodulation of the beam.

3. A method of monitoring and/or controlling the operating position of a mobile cutting means remote from a reference station at a predetermined position, comprising the steps of:
   (a) providing a first laser light beam from the reference station,
   (b) displacing said first beam under computer control while detecting the reflection of the first beam from a first measurement station in the vicinity of the mobile cutting means until coincidence occurs,
   (c) ascertaining from angular displacement relationships necessary to achieve coincidence the spatial co-ordinates of the first measurement station relative to the reference station,
   (d) ascertaining from a measurement of the transit time of the first beam and its reflection the distance between the first measurement station and the reference station,
   (e) providing a second laser light beam from the first measurement station,
   (f) displacing said second beam under computer control while detecting the reflection of the second beam from a second measurement station positionally associated with the cutting means and movable therewith until coincidence occurs,
   (g) ascertaining from angular displacement relationships necessary to achieve coincidence the spatial co-ordinates of the second measurement station relative to the first measurement station,
   (h) ascertaining from a measurement of the transit time of the second beam and its reflection the distance between the first and second measurement stations,
   (i) transferring resultant measurement data via at least one of the beams by modulation and demodulation,
   (j) collecting and assessing all the measurement data to evaluate the position of the mobile cutting means automatically and continuously, and
   (k) monitoring and/or controlling the operating position of the mobile cutting means in accordance with such assessment.

4. A method according to claim 3 and further comprising detecting angles of incidence of the first and second laser beams at the first and second measurement stations to produce information, transferring this information, and utilizing this information in controlling the displacement of the beams.

5. A method of monitoring and/or controlling the operating position of a mobile cutting means remote from a reference station, comprising the steps of:
   (a) providing a first laser light beam from the reference station,
   (b) displacing said first beam under computer control while detecting the reflection of the first beam from a first measurement station of known location until coincidence occurs,
   (c) ascertaining from angular displacement relationships necessary to achieve coincidence the spatial co-ordinates of the reference station relative to the first measurement station,
   (d) ascertaining from a measurement of the transit time of the first beam and its reflection the distance between the first measurement station and the reference station,
   (e) providing a second laser light beam from the reference station,
   (f) displacing said second beam under computer control while detecting the reflection of the second beam from a second measurement station positionally associated with the cutting means and movable therewith until coincidence occurs,
   (g) ascertaining from angular displacement relationships necessary to achieve coincidence the spatial co-ordinates of the second measurement station relative to the reference station,
   (h) ascertaining from a measurement of the transit time of the second beam and its reflection the distance between the reference and second measurement stations,
   (i) transferring resultant measurement data via at least one of the beams by modulation and demodulation,
   (j) collecting and assessing all the measurement data to evaluate the position of the mobile cutting means continuously and automatically, and
   (k) monitoring and/or controlling the operating position of the mobile cutting means in accordance with said assessment.

6. A method according to claim 5 and further comprising detecting an angle of incidence of the second laser beam at the second measurement station to produce information, and transferring and utilizing this information in controlling the displacement of the second beam.

7. A method of monitoring and/or controlling the operating position of a mobile cutting means remote from a reference station, comprising the steps of:
   (a) providing a first laser light beam from the reference station,
   (b) displacing said first beam under computer control while detecting the reflection of the first beam from a first measurement station of known location until coincidence occurs,
   (c) ascertaining from angular displacement relationships necessary to achieve coincidence the spatial co-ordinates of the reference station relative to the first measurement station,
   (d) ascertaining from a measurement of the transit time of the first beam and its reflection the distance between the first measurement station and the reference station,
   (e) providing a second laser light beam from a second measurement station in the vicinity of the mobile cutting means,
   (f) displacing said second beam under computer control while detecting the reflection of the first beam from a further measurement station positionally associated with the mobile cutting means and movable therewith until coincidence occurs,
   (g) ascertaining from angular displacement relationships necessary to achieve coincidence the spatial co-ordinates of the further measurement station relative to the second measurement station,
   (h) ascertaining from a measurement of the transit time of the second beam and its reflection the distance between the second and further measurement stations,
   (i) providing a third laser light beam from the reference station,
   (j) displacing said third beam under computer control while detecting the reflection of the third beam from the second measurement station until coincidence occurs, (k) ascertaining from angular displacement relationships the spatial co-ordinates of the second measurement station relative to the reference station, (l) ascertaining from a measurement of the transit time of the third beam and its reflection the distance between the second measurement station and the reference station, (m) transferring resultant measurement data via at least some of the beams by modulation and demodulation, (n) collecting and assessing all the measurement data with a central computer to evaluate the position of the mobile cutting means automatically and continuously, and (o) monitoring and/or controlling the operating position of the mobile cutting means in accordance with said assessment.

8. A method according to claim 7 and further comprising detecting angles of incidence of the second and third laser beams at the further and second measurement stations to produce information, and transferring and utilizing this information in controlling the displacement of the second and third beams.

9. A system for monitoring and/or controlling the operating position of a mobile cutting means, said system comprising:
(a) a reference station at a remote position from the mobile cutting means, said position being predetermined by measurements taken with respect to at least one fixed measurement point,
(b) a first measurement station positionally associated with the mobile cutting means and movable therewith,
(c) means for providing a laser light beam from the reference station to the first measurement station,
(d) means at the first measurement station for reflecting said beam back to the reference station,
(e) computer-controlled means at the reference station for displacing said beam,
(f) means at the reference station for detecting the reflection of the beam from the first measurement station until coincidence occurs, for ascertaining from angular displacement relationships to achieve coincidence the spatial co-ordinates of the reference station relative to the first measurement station and from a measurement of the transit time of the beam and its reflection the distance between the first measurement station and the reference station, and
(g) computer means for collecting and assessing the measurement data to evaluate the position of the mobile cutting means continuously and automatically.

10. A system according to claim 9, and further comprising a further measurement station constituted at said at least one fixed measurement point and reflective means at the further measurement station for reflecting said beam from the reference station back to the reference station, wherein said detecting and ascertaining means also detects the reflection of the beam from the further measurement station until coincidence occurs, ascertains from angular displacement relationships necessary to a achieve coincidence the spatial co-ordinates of the further measurement station relative to the reference station and from the transit time of the beam and its reflection the distance between the reference and further station to establish the predetermined location of the reference station.

11. A system according to claim 9 and further comprising means for detecting an angle of incidence of the beam at the first measurement station and for providing information usable by the reference station to control the displacement of the beam.

12. A system according to claim 9, and further comprising a control unit which controls the position of the cutting means automatically and continuously in accordance with the assessed measurement data.

13. A system according to claim 9, wherein the reference station employs individual angle-measuring instruments which determine the displacement of the light beam in two orthogonal directions and a magnetic instrument or gyro compass, the instruments providing readings to said computer means.

14. A system according to claim 9, wherein the stations employ means for modulating the laser beam and demodulation means for detecting information carried by the laser beam to transmit measurement data between the stations.

15. A system according to claim 9, wherein the reflective means is a triple-mirror device.

16. A system according to claim 9, wherein the reference station further comprises an optical system with a central window through which the laser beam is emitted, and the detection means includes a symmetrical array of lenses around the window and means for sensing the occurrence of equal intensities of reflected light entering the lenses to signify that the reflected beam is predominantly coincident to the emitted beam.

17. A system according to claim 16, wherein the lenses forming the symmetrical array are Fresnel lenses.

18. A system according to claim 16, wherein there is further provided a beam splitter serving to redirect the laser beam through the optical system which causes the beam to pass through the window and there is provided further sensing means for sensing reflected light parallel to the emitted beam passed back through the beam splitter and means for evaluating the transit time of the emitted beam and its reflection to ascertain the distance of the other station.

19. A system according to claim 14, wherein the reflective means is a triple-mirror device which employs a central light transmitting window and the demodulation means receives light passed through said window.

20. A system according to claim 11, wherein the reflective means is a triple-mirror device which employs a central light transmitting window and the detection means receives light passed through said window.

21. A system according to claim 9, wherein the reflective means is a triple-mirror device which employs a central light transmitting window and there is further provided a unidimensional optical processor disposed to receive light passing through said window and sensing means to indicate the angular direction of the light beam received by the mirror device.

22. A system for monitoring and/or controlling the operating position of a mobile cutting means, said system comprising:
(a) a reference station at a predeterminable position,
(b) a first measurement station at a known location,
(c) a second measurement station positionally associated with the mobile cutting means and movable therewith,
(d) a further measurement station intermediate the reference and second measurement stations, (e) means for successively providing a laser light beam from the reference station to the first measurement station and the further measurement station, (f) means at the first and further measurement stations for reflecting said beam when incident back to the reference station, (g) computer-controlled means at the reference station for displacing said beam, (h) means at the reference station for detecting the reflection of the beam from the first measurement station until coincidence occurs, for ascertaining from angular displacement relationships necessary to achieve coincidence the spatial coordinates of the reference station relative to the first measurement station and from a measurement of the transit time of the beam and its reflection the distance between the first measurement station and the reference station and for detecting the reflection of the beam from the further measurement station until coincidence occurs, for ascertaining from angular displacement relationships necessary to achieve coincidence the spatial co-ordinates of the further measurement station relative to the reference station and from the transit time of the beam and its reflection the distance between the reference and further measurement stations, (i) means for providing a further laser light beam from the further measurement station, (j) means at the second measurement station for reflecting said further beam when incident back to the further reference station, (k) computer-controlled means at the further measurement station for displacing said beam, (l) means at the further measurement station for detecting the reflection of the further beam from the second measurement station until coincidence occurs, for ascertaining from angular displacement relationships necessary to achieve coincidence the spatial co-ordinates of the second measurement station relative to the further measurement station and from a measurement of the transit time of the beam and its reflection the distance between the further measurement station and the second measurement station, (m) means for transferring and receiving measurement data between the stations by modulation and demodulation of at least some of the beams, and (n) computer means for collecting and assessing all the measurement data to evaluate the position of the mobile cutting means continuously and automatically.

23. A system according to claim 22, and further comprising means for detecting angles of incidence of the laser light beam and further laser light beam at each of the further and second measurement stations and for providing information usable by the reference and further stations to control the displacement of the beam and further beam.

* * * * *